June 6, 1944. J. S. PECKER ET AL 2,350,971
METHOD FOR FORMING PRESSED ARTICLES FROM POWDERS
Filed Oct. 18, 1940 12 Sheets-Sheet 1

FIG. 1.

INVENTORS
JOSEPH S. PECKER &
HENRY A. SIMPSON
BY
ATTORNEY

June 6, 1944. J. S. PECKER ET AL 2,350,971
METHOD FOR FORMING PRESSED ARTICLES FROM POWDERS
Filed Oct. 18, 1940 12 Sheets-Sheet 3

INVENTORS
JOSEPH S. PECKER &
HENRY A. SIMPSON
BY
ATTORNEY

INVENTORS
JOSEPH S. PECKER &
HENRY A. SIMPSON
BY
ATTORNEY

INVENTORS
JOSEPH S. PECKER &
HENRY A. SIMPSON
BY
ATTORNEY

June 6, 1944.   J. S. PECKER ET AL   2,350,971
METHOD FOR FORMING PRESSED ARTICLES FROM POWDERS
Filed Oct. 18, 1940   12 Sheets-Sheet 11

INVENTORS
JOSEPH S. PECKER &
HENRY A. SIMPSON
BY
ATTORNEY

Patented June 6, 1944

2,350,971

UNITED STATES PATENT OFFICE 2,350,971

METHOD FOR FORMING PRESSED ARTICLES FROM POWDERS

Joseph S. Pecker and Henry A. Simpson, Philadelphia, Pa., assignors, by mesne assignments, to Joseph S. Pecker, New York, N. Y.

Application October 18, 1940, Serial No. 361,656

6 Claims. (Cl. 29—160.5)

This invention relates to a method of forming pressed metal articles from powders—organic, metallic or mineral.

An object of the invention also includes the method of forming an article in separate pressure operations and to unite the parts so formed by pressure weld, or prior to other processing such as sintering as shown in our co-pending application, Serial No. 341,830.

A further purpose is to form an article of powdered alloy or the like by pressure in the direction of the its lesser dimension, whereby a comparatively short pressure stroke can be employed, and by a plurality of such short stroke formations finally produce a piece having greater depth than breadth.

A further purpose is to automatically measure the amount of powder used in each operation, and to manipulate the powder prior to compression so as to create separate areas of powder in relation to the finished article throughout the several required pressure operations.

A further purpose is to utilize multiple plunger dies or punches which are operable from above, below, and from the sides and at various angles, to create predetermined areas of powder, and to utilize the same plunger dies to press the powder to desired shape within cavity dies and to pressure weld the separately formed portions together.

A further purpose is to provide orifices within the initial formation to receive and hold powder introduced in subsequent operations to assist in the union of a subsequent formation by pressure weld.

A further purpose is to provide a practical method for accomplishing the objects set forth, first, in a complete automatic and continuous operation and, second, in a complete automatic operation having an intermittent movement.

A further purpose is to secure automatic redistribution of the powder within cavity dies after filling, so as to create areas having more powder than others, and to prepare these different areas in a predetermined relation to subsequent pressure operations, whereby a given ratio of powder to pressure stroke is obtained.

Suitable means for effecting the invention are described and illustrated, by way of example in the following drawings in which.

Similar numerals refer to similar parts throughout the several views.

Figure 1:
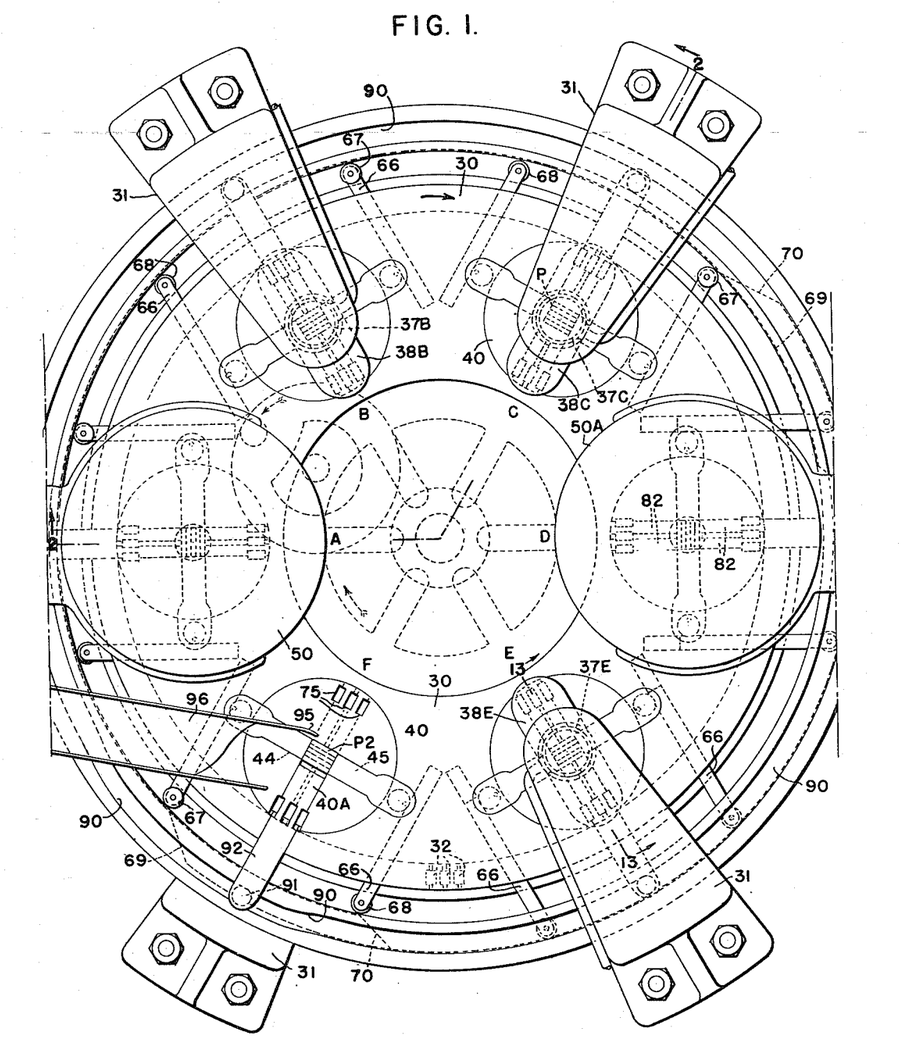
Fig. 1 is a plan view of our improved device, showing the intermittent type design.
Figure 2:
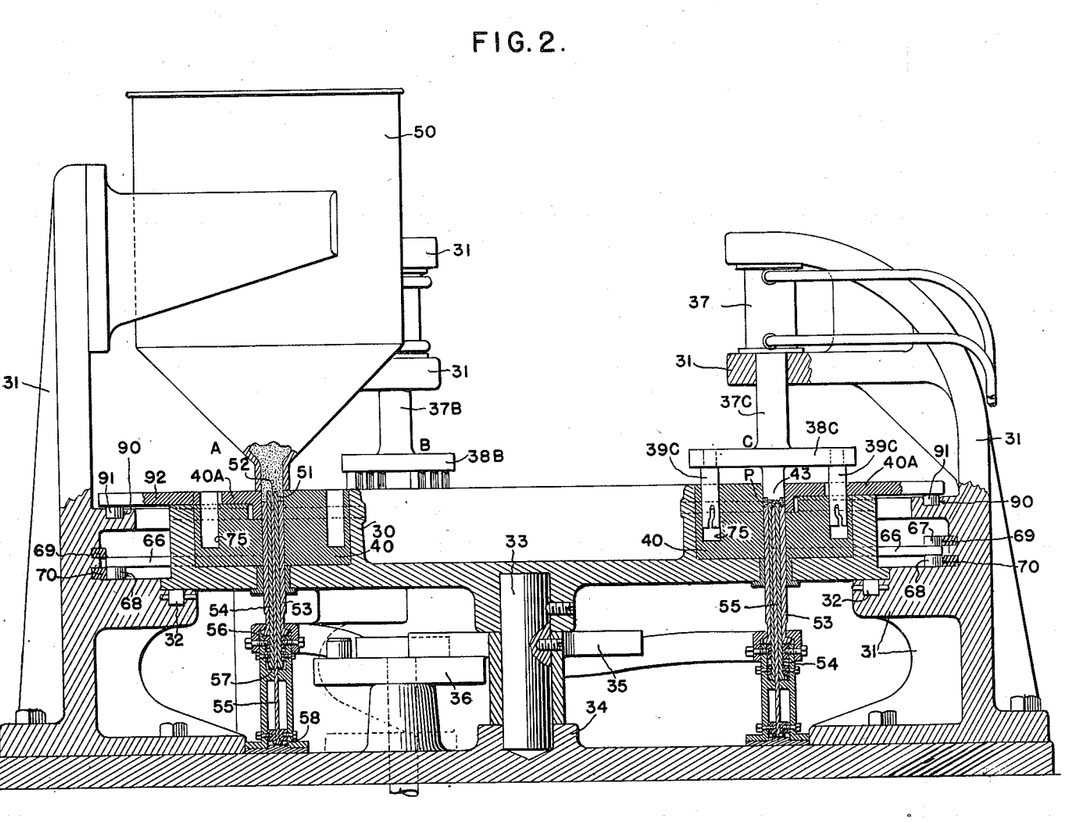
Fig. 2 is a transverse section taken on line 2—2 of Fig. 1.

Referring now to the drawings, and especially to Figs. 1 and 2, it will be observed the general design of this disclosure comprises a suitably supported intermittently rotating head, carrying dies which are successively presented to various stations at which several of the operations take place simultaneously, while other operations are performed during and by the movement of the head between the several stations.

In order to clearly illustrate the operation of the machine, one of the forming dies and its various coacting component parts is separately shown in association with each of the several operating stations, as the piece is progressively formed.

The particular piece here shown has been chosen merely as an illustration of the range of capabilities of the machine, and is in no way to be construed as a limitation to this individual design. It has been chosen as a representative product because of its variety of surface contours, including indentures and pierced openings, being formed by vertical actions both from above and below, and by horizontal actions from both sides and includes the formation of angles.

An almost endless variety of articles can be produced without changing the principle of the machine or the method of forming.

Attention is here drawn to the fact that the successive stages of formation of the piece are all made in the direction of its lesser dimension. This is desirable in articles requiring a plurality of operations to complete the piece, as a far more uniform product is thus obtainable and an even density is assured. It is a purpose of our device and a method employed thereby, whereby desired dimensions in one direction are obtained by a plurality of short stroke operations, and the several independent formations successively welded together by the pressure of each succeeding stroke.

In the drawings, only the required number of stations to form the particular piece illustrated are shown, namely six (6). It will be understood, however, that in a commercial interchangeable machine, an additional number of stations would be present to take care of articles requiring more operations in their formation, such as that illustrated in Figs. 39 to 43 inclusive. Those stations not used in the formation of a piece requiring less operations would merely be left as idle stations.

The six stations here illustrated are respectively designated in the drawings by the letters A—B—C—D—E and F, A representing that station at which the powder alloy is first measured and introduced to the die; B, that station where the first compressions take place; C, the station where the partly formed piece is moved to a new position to allow the introduction of mandrels, which introduction takes place during the travel of the head to the next station, D—where a second supply of powder alloy is introduced; E, where top and side compressions are employed; and F, where the mandrels are moved out, the die opened and the finished product ejected therefrom, to be moved off later by contact with a fixed plate arranged at an angle in its advancing path. The two latter movements, the withdrawal of the mandrels and the opening of the die block, take place between stations and during the forward rotation of the head, so that if it were not for required timing, the present machine could be operated with five stations to a cycle.

The rotatable head is indicated at 30, suitably supported and guided by bearing members 31, and having roller bearings 32 suitably placed to assist in the rotation of the head. The head 30 also carries a centrally arranged vertical shaft 33 which is supported at its base in a suitable casting 34. This shaft 33 has fastened thereto the driven element 35 of a well-known Geneva motion, the driving element 36 being connected to any suitable power source, not shown.

Certain of the bearing members 31 extend above the rotatable head at stations B, C and E, and support fluid operated pistons 37 of any well-known type, which when operated, control the pressing and positioning operations, while the bearing members 31 at stations A and D likewise extend above the rotatable head and respectively support hoppers 50 and 50A containing a supply of powder.

The head 30 carries a plurality of die blocks 40, one for each operating station and they are advanced the distance between one station with each turn of the driven element 35 of the Geneva motion, each die receiving a charge of powdered metal during its dwell at station A and then being advanced intermittently to each subsequent station and being subjected to the various required operations until each of the finished articles are automatically removed between stations F and A by the action of the advancing head as hereafter described.

During the period of travel of each die block between the various stations, certain movements take place relating to the manipulation of the die plungers to proportion the relative amount of powder required in the formation of the piece at various points, or to create a body of powder having a cross-sectional area in a given proportion to the finished compressed piece. Further, the forward movement of the head 30 also causes the operation of the mechanisms which control the insertion and withdrawal of mandrels, as well as the opening of the die blocks to release the piece.

Assuming a die block 40 has just been presented to station A (referring to Figs. 1, 2, 3 and 4) and it is brought to a dwell beneath the powder feeding hopper 50, the powdered material flows by gravity from the hopper into the various cavities of the die indicated at 51 and 52 and formed by the positioning of a plurality of plungers 53, 54 and 55. These plungers are respectively controlled by cams 56, 57 and 58 designed to cause them to rise and fall as the head 30 is advanced. The cams are fixed and arranged in circular paths, one beneath each die plunger, and are so designed as to cause the plungers to operate independently of one another and at such times as to cooperate with the preforming of powder areas in a given relation to the several compression movements hereinafter described (see Figs. 2, 7 and 13).

Figures 3, 4:
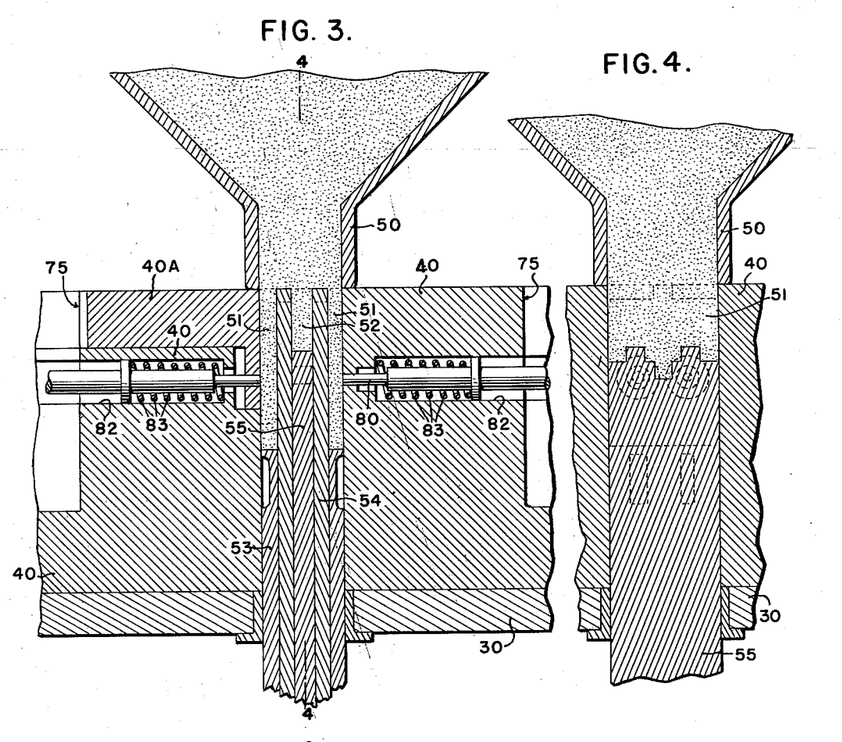
Fig. 3 is an enlarged fragmentary sectional detail of the first hopper and a forming die associated therewith in the relative positions occupied at station A, Fig. 1.
Fig. 4 is a vertical section on the line 4—4 of Fig. 3.

With the die adjusted as shown in Figs. 3 and 4, and filled with powder, it is advanced to the next station B. During this advance, the powder is prevented from leaving the bottom of the hopper 50 by the top of the head 30, which lies flush with the top of each die block 40, so that the bottom of the hopper is always closed except at those times when a die cavity is aligned with it.

At station B, the supporting frame 31 is built up above the turn-table 30, to support one of the fluid driven pistons 37B. These pistons are controlled and operated from the usual "organ" or control board common to hydraulic machines, and are designed to automatically make one reciprocating stroke as the turntable or head 30 comes to rest with the dies aligned with the plungers by the Geneva motion.

All the piston plungers operate in unison and are suitably guided in their respective frames 31, each being provided with a cross head 38B, 38C or 38E, the outer free ends of which carry depending studs 39B, C or E which, in turn, act as guides for the respective punches carried on each plunger.

At station E, the studs 39E have an additional function, that of operating horizontal dies, which operation will be later described in connection with that particular station.

Figures 7, 7A, 8:
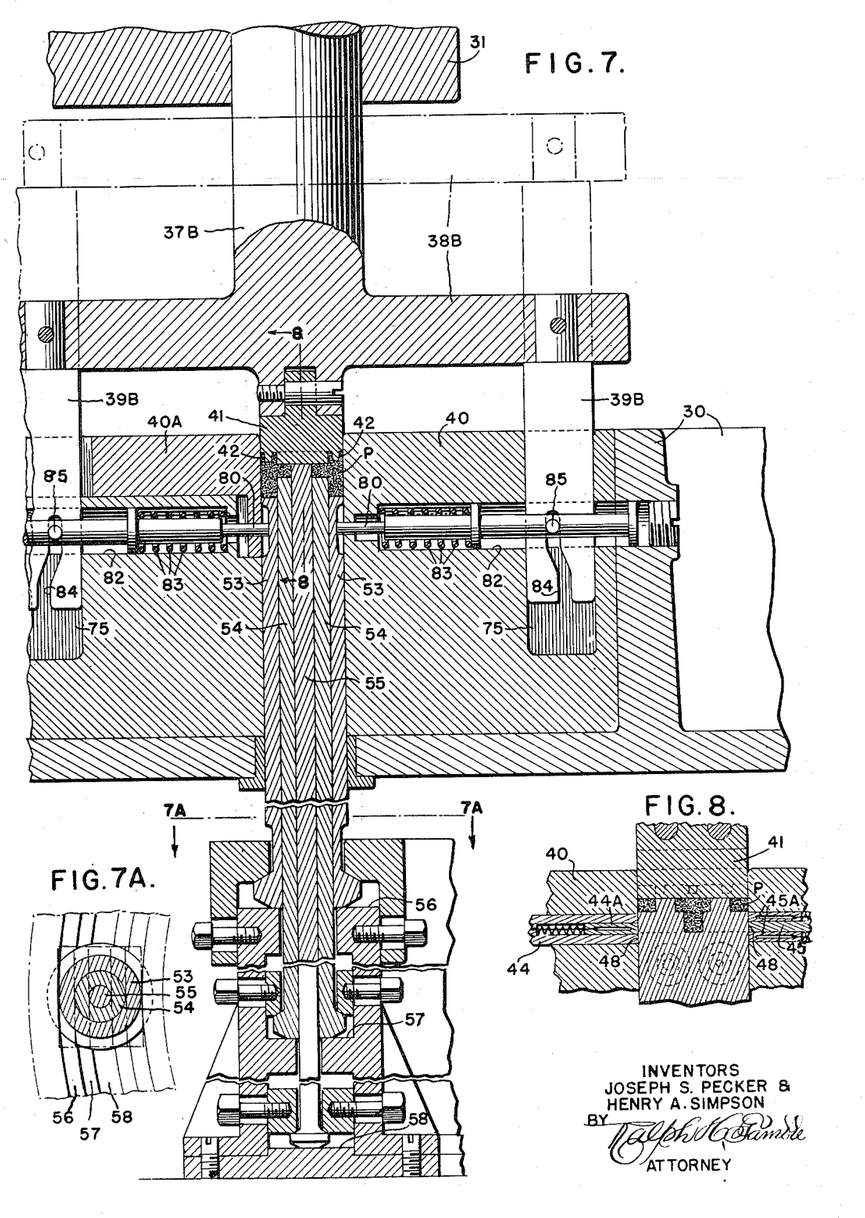
Fig. 7 is a sectional elevation similar to Fig. 3, showing the relative parts in the positions occupied at station B.
Fig. 7A is a horizontal section on line 7A—7A of Fig. 7.
Fig. 8 is a fragmentary sectional elevation taken on line 8—8 of Fig. 7.
Figure 23:
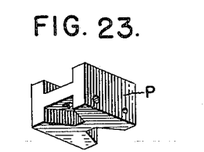
Fig. 23 is a perspective view of the piece as formed by the initial pressure operation of the machine, showing a front, side and bottom thereof.
Figure 24:
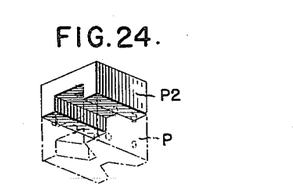
Fig. 24 is a similar view illustrating in full lines the second formation, while the first formation is indicated in dot and dash line in its relative connected position.
Figure 25:
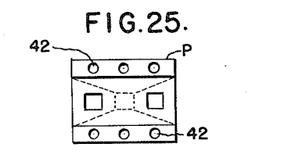
Fig. 25 is a top plan view of the piece shown in Fig. 23.
Figure 26:
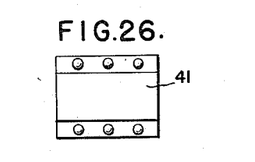
Fig. 26 is a bottom plan view of the under face of the punch for forming the piece shown in Fig. 23.
Figure 27:
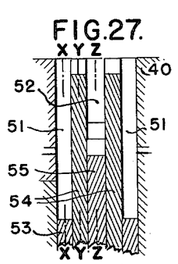
Fig. 27 is a fragmentary sectional elevation of a cavity die and plungers in the relative positions occupied at station A.
Figure 28:
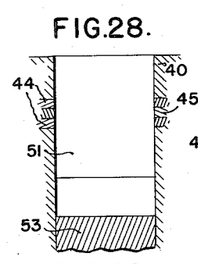
Fig. 28 is a sectional elevation taken on line 28—28 of Fig. 27.
Figure 29:
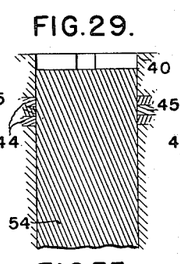
Fig. 29 is a sectional elevation taken on line 29—29 of Fig. 27.
Figure 30:
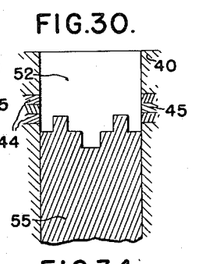
Fig. 30 is a sectional elevation taken on line 30—30 of Fig. 27.
Figure 31:
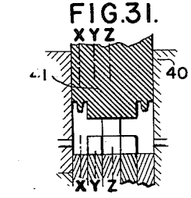
Fig. 31 is a view similar to Fig. 27 showing the parts in the relative positions occupied at station B.
Figure 32:
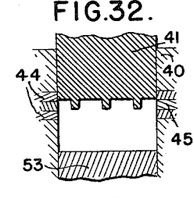
Fig. 32 is a sectional elevation taken on line 32—32 of Fig. 31.
Figure 33:
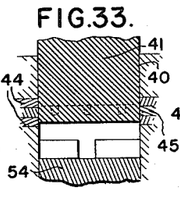
Fig. 33 is a sectional elevation taken on line 33—33 of Fig. 31.
Figure 34:
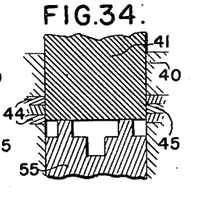
Fig. 34 is a sectional elevation taken on line 34—34 of Fig. 31.
Figure 35:
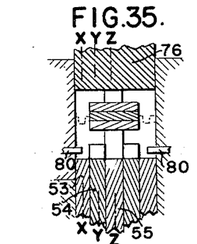
Fig. 35 is a view similar to Fig. 27 showing the parts in the relative positions occupied at station E.
Figure 36:
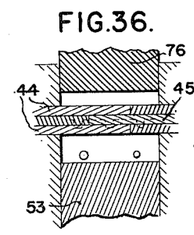
Fig. 36 is a sectional elevation taken on line 36—36 of Fig. 35.
Figure 37:
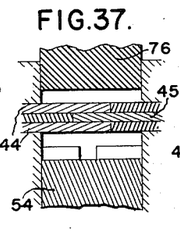
Fig. 37 is a sectional elevation taken on line 37—37 of Fig. 35.
Figure 38:
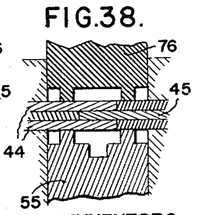
Fig. 38 is a sectional elevation taken on line 38—38 of Fig. 35.

With the die plungers 53—54 and 55 positioned by their respective cams as seen in Fig. 7, the piston plunger 37B descends and punch 41 compresses the powder to a shape P, such as illustrated in Fig. 23.

To further assist in the union of the separately formed parts, we provide depressions in the initial formation as seen at 42, Fig. 7, which are filled with powder at the second loading, and under the second compression, tend to fuse with the initially formed piece. During a subsequent sintering operation, to which all such formations as here disclosed are subjected, the parts are fused together in a homogeneous mass, and the point of union becomes as strong as any other portion of the piece.

In pieces which require more than two operations to complete, each section is provided with depressions as aforesaid with the exception of the last, which being the topmost, has no requirement for same and is finished to desired shape by the final compression stroke.

We have discovered that the creation of increased areas of powder in relation to the formation of these depressions, aids materially in the strengthening of the points of union during pressure weld and an increased density is thereby obtained at these points. To this end, we have devised the mechanism shown in Figs. 39 to 43 inclusive, which can be positioned at additional stations following each powder feed and operated for the purpose of distributing or repositioning the powder within the die cavities in relation to the subsequent pressure of plungers or punches.

The device is further useful to assist in arranging the second and/or subsequent powder introductions in such manner, within the die cavity, as to position the powder for maintaining the correct ratio of powder to required plunger strokes following the introduction of the mandrels.

In the present instance, we will assume the mechanism to be operated from a piston the same as the other plungers at stations B, C and E, it being understood that the stroke is synchronized with the dwells the same as at the other stations, and that the type of operating mechanism is immaterial so long as it produces a single cycle and pauses until tripped again for a repeating operation. Such a piston rod is shown at 37M reciprocatably supported in frame 31 and carrying at its lower end a slidable casing structure 37N having an internal contour corresponding to the cavity opening within die block 40.

This casing is held within the piston 37M by two shafts 37O each of which forms the fulcrum for a finger 37P. These fingers are of oppositely opposed formations designed to rest normally back to back and be retained in this position by tension springs 37Q. Extending from the hub of each finger structure and in line with the respective shafts 37O is a pin 37R, the outer free end of which rides within a slot 37S formed in the side walls of the slidable casing 37N. The casing 37N is further provided with slots 37T surrounding each of the supporting shafts 37O.

The lower end of each finger structure 37P is shaped, in the present instance as at 37U, it being understood that the design may vary with the requirements of the piece being formed.

Figure 39:
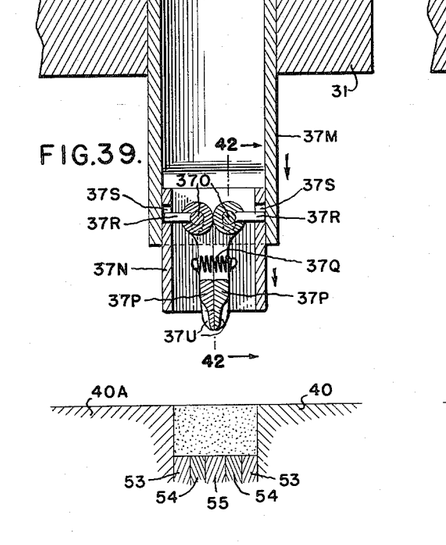
Fig. 39 is a fragmentary sectional elevation of a reciprocating piston rod supporting powder disturbing fingers and cooperating mechanism.
Figure 40:
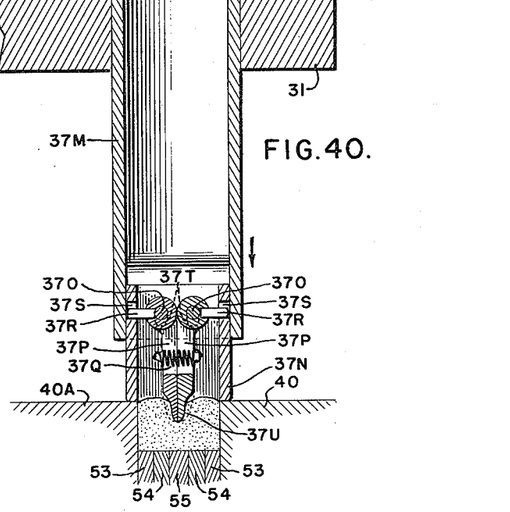
Fig. 40 is a view similar to Fig. 39 illustrating the powder disturbing fingers entered into the powder area.

In operation, the piston rod 37M is normally suspended as shown in Fig. 39, and when the die block 40 is brought to dwell beneath it, the piston is caused to descend until the lower ends 37U of the fingers 37P enter the powder within the die cavity. About the same time the casing 37N has contacted with the top of die block 40, as clearly shown in Fig. 40, preventing any powder displaced by the fingers 37P from being moved from out the area of the cavity.

Figure 41:
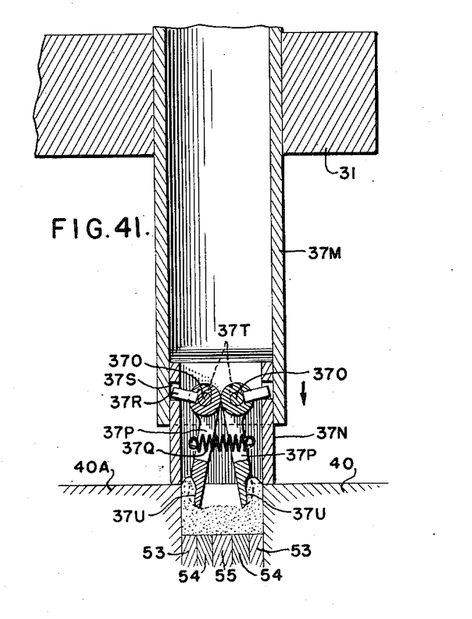
Fig. 41 is a view similar to Fig. 39 showing the fingers having been moved while in the powder area.
Figure 42:
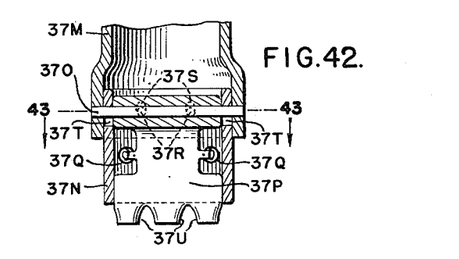
Fig. 42 is a fragmentary sectional elevation, taken on line 42—42 of Fig. 39.
Figure 43:
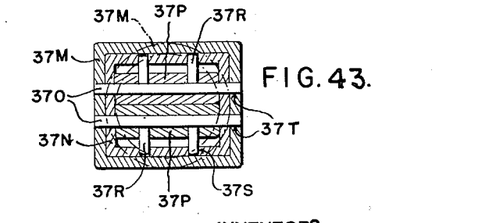
Fig. 43 is a sectional plan taken on line 43—43 of Fig. 42.

Further downward movement of the plunger 37M and therewith the shafts 37O, causes the projecting pins 37R, resting within slots 37S to rotate the hubs of the respective fingers 37P about their shafts 37O causing the free ends of the fingers to move outwardly away from each other against the tension of springs 37Q as clearly illustrated in Fig. 41.

This latter movement is very slight being limited by the length of slots 37T within the sliding casing 37N (see Fig. 42) which slot permits the further movement of plunger 37M after the casing 37N has contacted the top of die block 40. It will be observed by the position of the powder within the die cavity in Fig. 41 that the powder is now "hilled up" and concentrating as shown in Figure 41 in those areas in which it is desired to unite the separate piece formations by pressure weld, and wherein subsequent depressions are formed to assist in this pressure welding operation.

As the piston rod 37M starts its return movement, the two shafts 37O move therewith riding in slots 37T and the springs 37Q draw the fingers 37P toward each other, until they meet (as in Fig. 40), the projecting pins 37R riding in slots 37S. As soon as the shaft 37O engages the top of slots 37T, the sliding casing 37N is picked up and moved with the piston rod 37M back to the normal rest position illustrated in Fig. 39, where it is held until the piston is again operated for another cycle as just described.

This same mechanism is also applicable to preformations of powder within the cavities to maintain ratios after mandrels have been inserted and the lower die plungers are no longer capable of this work.

With the completion of the initial pressing of the piece at station B, head 30 and therewith the die block 40 is advanced to the next station C which is illustrated in section at the right side of Fig. 2. Here the piston plunger 37C is caused to move down through its hydraulic control, carrying therewith a punch 43 designed to contact the piece P as formed at station B and move the same to a lower level. The new position of the piece permits of the insertion of a pair of mandrels 44—45 above this formation, which insertion takes place during the advance of the head 30 to and before reaching the next station.

These mandrels are provided with interfitting ends 48—48 which are designed to overlap and unite to form a joint as at 49 (Fig. 14) when in closed position, such a joint providing strength at a point of pressure, thereby avoiding sheering by the upper punches. The spring pressed ends 44A and 45A are designed to cooperate with the ends of their respective mandrels to close the walls of the die cavity when the mandrels are in their withdrawn positions and to be moved out of the travel path of the mandrel ends when the latter are moved to their engaging position.

Figure 9:
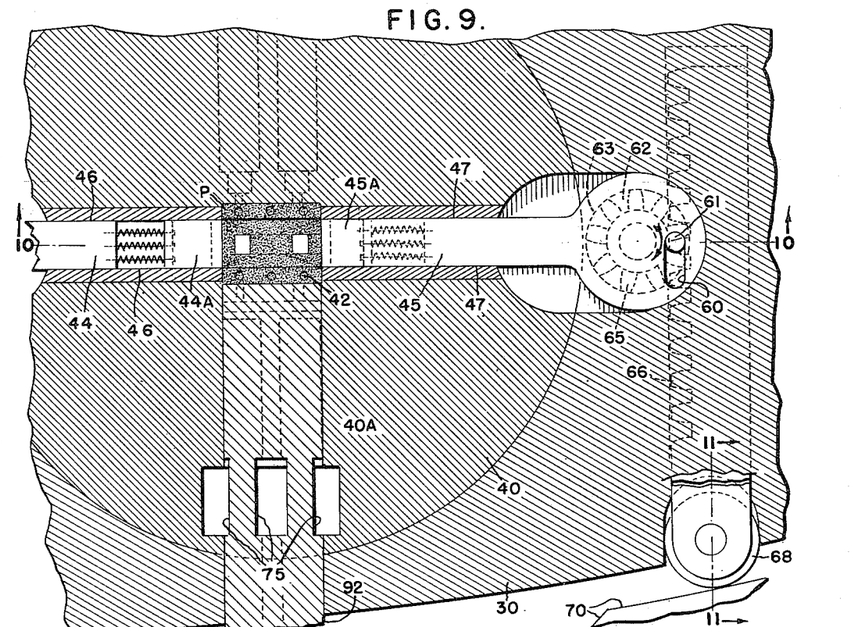
Fig. 9 is a partial sectional detail plan of a die block with mandrels, and the operating mechanisms therefor.
Figure 10:
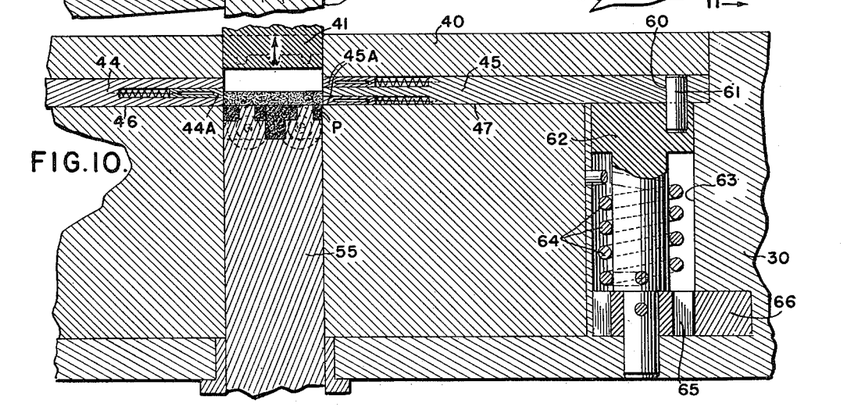
Fig. 10 is a sectional elevation on the line 10—10 of Fig. 9.
Figure 11:
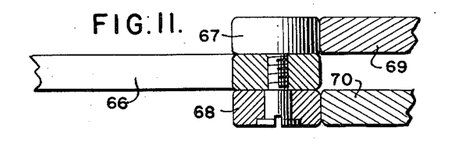
Fig. 11 is a sectional elevation taken on line 11—11 of Fig. 9 showing cams for operating the mandrels.

Referring now to Figs. 9, 10 and 11, the mandrels 44 and 45 are indicated in their out position, i. e., disengaged from the forming portion of die block 40 and are respectively positioned within slots 46—47, formed in the block. The inner end of each mandrel is shaped to cooperate with the forming dies while at the outer free end thereof is formed a slotted head portion 60, adapted to receive a pin 61 eccentrically mounted upon a stud shaft 62. These stud shafts are positioned in openings 63 formed in the head 30, and their lower ends are of decreased diameters to provide for coil springs 64, and pinions 65, the latter being fixed to the studs while the spring has one free end fixed to the stud and the opposite free end fixed within the head 30 in such manner as to tend to turn the stud in the direction of the full line arrow, Fig. 9, thereby normally forcing the mandrels toward one another.

Cooperating with pinions 65 and guided within suitable slots in head 30 are racks 66, the outer free ends of which extend beyond the outer periphery of head 30 and carry rollers 67—68 thereon, said rollers contacting respectively with cams 69—70, fixedly supported upon the bearing members 31.

The mandrels are normally held out of their operative position by the action of cams 69—70 causing the rack arms 66 to move inwardly against the action of their respective springs 64, moving pins 61 eccentrically within slots 60 to move the mandrels away from engagement with the dies. When any given die block moves beyond station C, cams 69—70 permit the rollers 67—68 on racks 66 to move outwardly under the urge of the coil springs 64, and permits the turning of stud shafts 62 and their eccentrically mounted pins 61, said pins riding in slots 60 of the respective mandrels, urge the latter to closure in relation to the forming dies and above the initially formed piece P, as clearly seen in Figs. 5 and 6.

Figure 5:
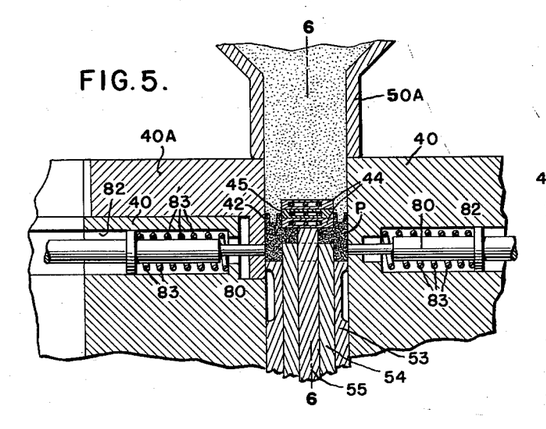
Fig. 5 is a section similar to Fig. 3 but showing the several parts as they would appear when associated with the second hopper at station D.
Figure 6:
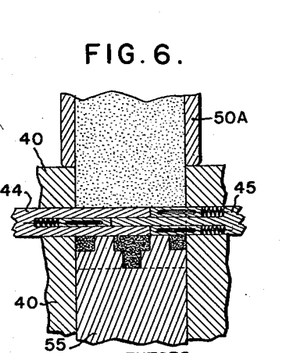
Fig. 6 is a vertical section on line 6—6 of Fig. 5.

Before the die blocks reach station D under the second hopper 50A, both mandrels 44 and 45 have closed to form joint 49 over the piece P and are in position to assist in the second operation, or the formation of piece P2. With the mandrels in this closed position, powder is introduced to the die during its pause at station D, as seen in Figs. 5 and 6. With powder introduced for the second time, the die is again advanced to station E where the point of final compression (in the case of a two-compression piece) takes place.

As before stated, the action of the fluid operated piston 37E at this station is identical with that of the corresponding pistons at stations B and C.

Figure 12:
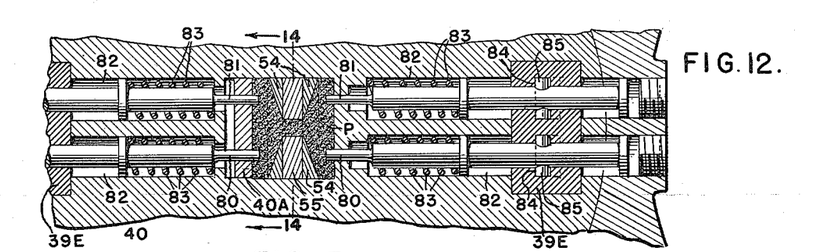
Fig. 12 is a sectional plan taken on the line 12—12 of Fig. 13, and illustrating the several relative positions of parts of a die block when positioned at station E.
Figures 13, 14:
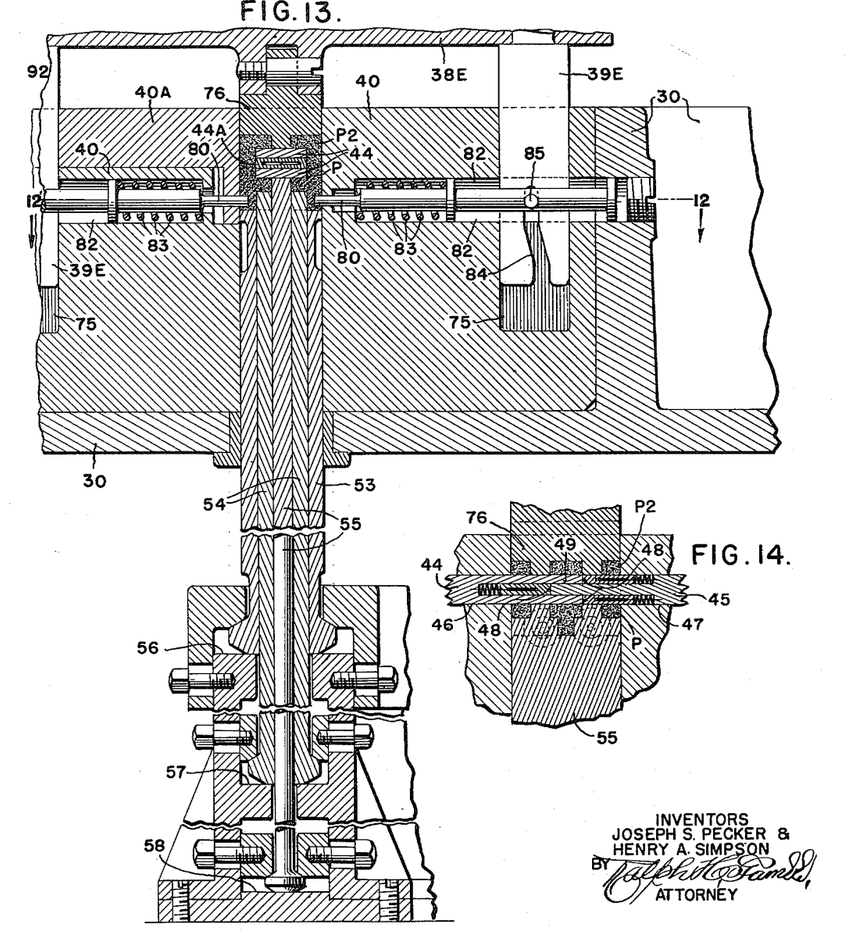
Fig. 13 is a sectional elevation taken on line 13—13 of Fig. 1.
Fig. 14 is a sectional elevation taken on line 14—14 of Fig. 12.

Referring now to Figs. 12, 13 and 14, a crosshead 38E carries at either outer end depending studs 39E adapted to enter openings 75 formed in the die block 40 and of corresponding shape and size to the studs. The cross-head also carries a punch 76 designed to cooperate with the die opening formed within die block 40 and the mandrels 44 and 45, to compress the powder injected at station D to the shape shown at P2 and to fuse or pressure weld the portion P2 to the portion P initially produced.

It will be understood that in all the changes of die shapes, the respective cams 56, 57 and 58 are designed to cooperate with the several required movements of the die plungers 53, 54 and 55 and between each station the various movements to effect the required changes take place during the advancement of the head 30, so that these dies have been properly positioned prior to their arrival at their points of dwell.

At this station, horizontal punches are operated to provide depressions of different diameters in each side of the piece. This is accomplished by the introduction of punches 80—80 and 81—81, slidably fitted with openings 82 formed in the die block 40 and head 30. These punches are normally held away from the piece in formation by expansion springs 83—83, and are forced inward toward the piece by the action of slotted cams 84 formed in the depending studs 39E, coacting with pins 85 fixed in the punches.

Figure 19:
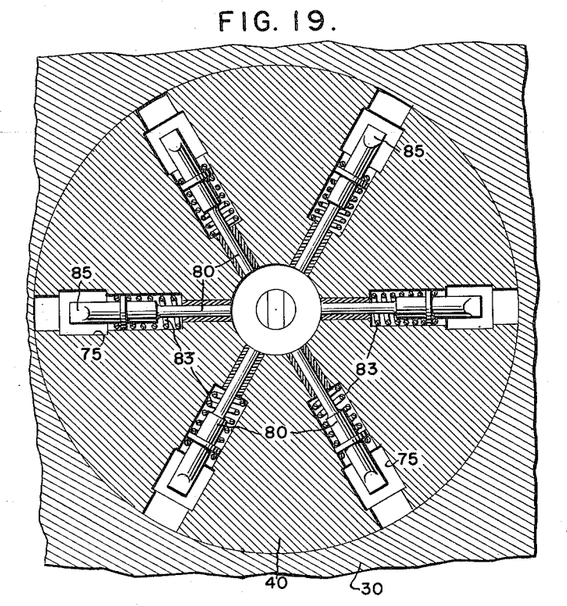
Fig. 19 is an alternate arrangement of horizontal punches within a die block.

In the present instance, four plungers are provided as will be seen by referring to Fig. 12, and their actions provide depressions of different diameters in each side of the finished piece. It will be understood, however, that the size and nature of the work accomplished by this action is limited only by the design of the punches, and they may be made to pierce as well as depress. If desired, the punches 80—81 could be arranged radially about the die block as illustrated in Fig. 19, and caused to operate on various faces of the piece in formation.

Figures 21, 22:
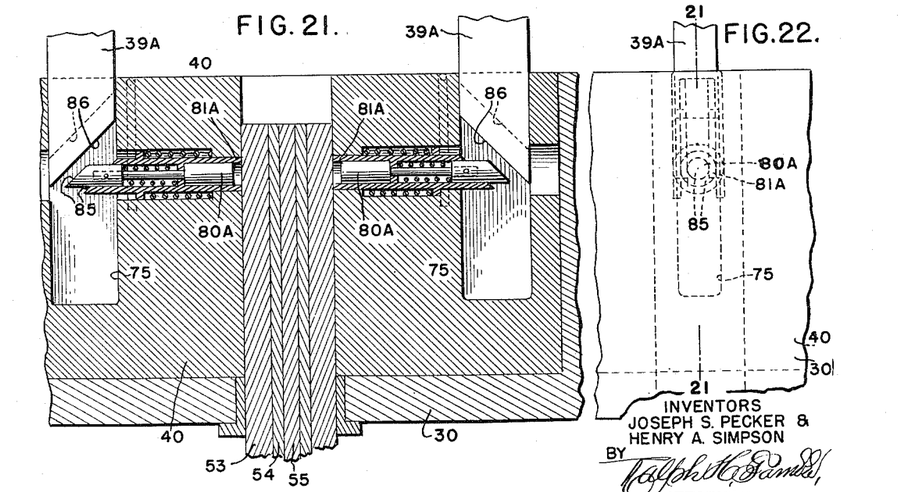
Fig. 21 is a sectional elevation of a modified form of multiple horizontal punch, taken on line 21—21 of Fig. 22.
Fig. 22 is a side elevation of the parts illustrated in Fig. 21.

We further appreciate the possibilities of using multiple punches in association with this horizontal action, both in proportioning the powder prior to compression and to complete the pressure stroke. An example of such an arrangement is shown in Figs. 21 and 22, wherein a central punch 80A is surrounded by a punch 81A, each spring pressed away from the piece and moved to the work by coacting cam faces 85—85 located respectively on the outer free ends of the plungers and the lower ends of depending studs 39A. The shapes of these cams can be designed to create a variety of actions and relatively time the strokes of the punches, and the length thereof.

The withdrawal of the studs 39E permits the springs 93 to move the punches away from the work, so that they are automatically withdrawn simultaneously with the withdrawal of the punch 76.

In the production of the present piece, the recompressing is now completed, and the die block 40 is carried forward to the next station F. Prior to its arrival, the cams 69 and 70 are shaped to force the racks 66 inward turning studs 62 through connection with pinion 65 and therewith the eccentrically positioned pins 61 in slots 60 to cause mandrels 44 and 45 to be withdrawn from the finished piece.

Figure 15:
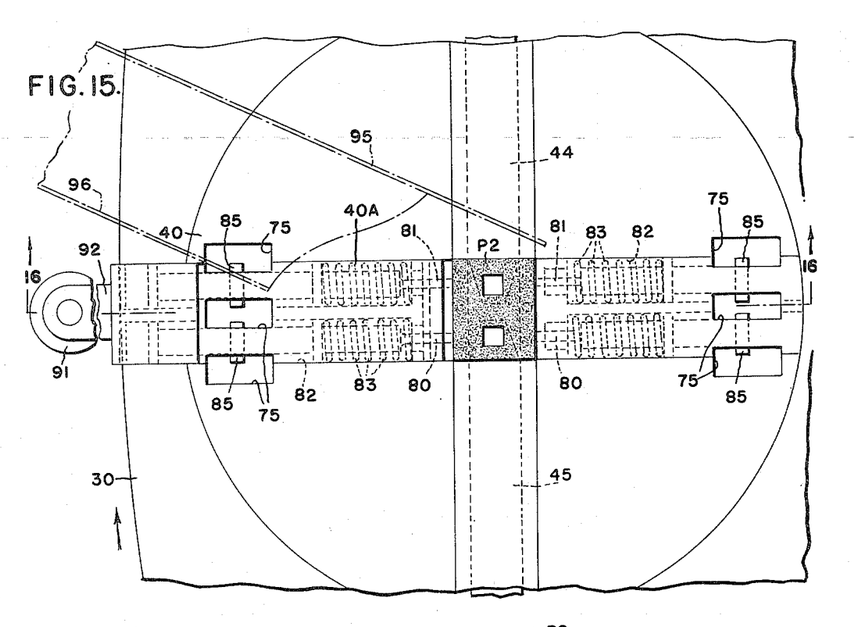
Fig. 15 is a detailed fragmentary plan view of a die block when positioned at station F.

About the same time, a grooved cam 90 similarly mounted to the cams 69—70, guides a roller 91 attached to the outer free end of an arm 92 which, in turn, is connected to a separable portion 40A of the die block 40, to cause the forming dies to separate. (See Figs. 1, 15 and 16 for separated position, and Figs. 2, 3, 5, 7, 9, 12 and 13 for closed position.)

The completed piece comprising the initial formation P and the final formation P2, pressure welded together, is now relieved of side pressure and the mandrels have been withdrawn, leaving the piece resting on top of the three plunger dies 53, 54 and 55 and below the upper face of the die block 40. As the head 30 is again advanced, the cams 56, 57 and 58 cause their respective plunger dies to rise and carry the finished piece to the level of the top of the die block, holding it in this position until it is advanced to a wall 95 arranged in its path of travel (see Figs. 15 and 16). The continued forward movement of the head cooperating with this wall, cams the finished piece from the die and off the die block to be taken up upon a chute 96 or other suitable conveying means to carry the completed piece away from the head. The die plungers 53, 54 and 55 are then moved during the remainder of this travel to the respective positions occupied at the beginning of the cycle, and when they reach the next station A, they are again positioned to receive an initial charge of powder as previously described and illustrated in Figs. 3 and 4.

Coincident with this final movement of the die block, the cam 90 causes the roller 91 and therewith arm 92 to move inward and force the separable portion 40A of the die block to closure.

It will be understood that the various operations are all taking place simultaneously, and that the several mechanisms are operating in unison upon each of the die blocks as they are successively presented to the several stations. In the following description of the operation, we will take one individual die block and advance it through its particular cycle from the initial powder introduction to the final ejection of the finished piece.

Starting at station A, we will assume that the die we have selected to follow through a cycle of operation has just been presented at that point with the parts in the relative positions indicated in Figs. 3 and 4. Under the influence of the Geneva motion, the head 30 and therewith the die block 40 pauses beneath hopper 50 a sufficient length of time to permit powder to flow from the hopper and fill the cavities 51 and 52, the relative positions of the die plungers 53, 54 and 55 determining the amount of powder the cavities will hold, and the relative positioning of the powder therein.

The shape of the bottom of the hopper in plan is the same as that of the cavity in plan. Due to the relative constructions of the head 30 and the bottom of hopper 50, when the cavities are filled, powder can no longer flow and the supply within the hopper is stopped from feeding by the powder within the die. The depth of the cavity die as determined by the positioning of the respective die plungers, acts as a means to measure the amount of powder required in each of the separate areas within the cavity to establish a given ratio of powder to finished piece, thereby assuring an even density throughout the pressed piece, and at the same time prevent overloading which might result in breakage of punches or mandrels.

With the first advance of the head 30 (station A to B), a separation of the powder will occur on a line along the top of the die block and the bottom of the hopper, the flush top of the advancing die block contacting beneath the stationary hopper and preventing the powder therein from leaving until the next succeeding die block and cavity is brought into register.

As the head makes its advance to the second dwell position, the die plungers 53, 54 and 55 are moved and finally brought to rest in the respective positions illustrated in Fig. 7. The fluid operated pistons are now energized during the dwell, the head 37B descending, the depending lugs 39B entering guide openings 75, assist in positioning upper forming punch 41 to enter the die and compress the powder to the formation P. With the completion of this compression, the fluid pistons 37 start their up stroke, the punch and depending guide pins withdrawn and the head is again advanced (station B to C) by the Geneva motion.

During this advance, the piston plungers 53, 54 and 55 are dropped in unison, the distance of the thickness of the mandrels 44 and 45 (see Fig. 2).

At the dwell at station C, the head 37C is caused to descend, depending studs acting to guide the punch 43 to within the die and move the piece P to the lower level determined by the die plungers. This accomplished, the punch is withdrawn by reverse action of piston plunger 37—C, and the head 30 is again advanced (station C to D).

As the head and therewith die block 40 is now advanced, cams 69 and 70 permit the racks 66 to move outward urged by action of springs 64, through their stud and pinion connections and at the same time cause the eccentrically mounted pins 61 through their slot connections 60 to move the respective mandrels 44—45 toward one another until they close over and within the previously formed piece P, the mandrel ends being designed to cooperate with the die formations (see Figs. 9, 10 and 11).

Each mandrel 44 and 45 is provided with spring pressed portions 44A and 45A respectively, engaging faces 48 on the mandrel 44, being adapted to engage and move the portions 45A, while the face 48 on the mandrel 45, engages and moves the portion 44A. When withdrawn, the parts occupy the positions shown in Fig. 10 and when fully advanced to meeting and overlapping position, the parts occupy the positions indicated in Fig. 14, to form the joint 49.

With the arrival of the die block at station D, the mandrels are in place as shown in Figs. 5 and 6, and as the die cavity is brought to register with the bottom of hopper 50A, powder is permitted to flow therein until the cavity is completely filled, including depression 42 in piece P. This completes the operation at station D.

The head is now advanced to station E, during which there is no change in the relative positions of the piece forming elements.

During the dwell at station E, the fluid operated piston 37E causes the head 38E to descend, the depending studs 39E entering openings 75 in die blocks 40, guide the punch 76 to pressure position, forming the second piece P2 and pressure welding the contacting portions, including the powder filled in the depressions 42. As the studs 39E are descending, their slotted cams 84 engage pins 85 fixed in the horizontal punches 80 and 81, forcing the latter into engagement with the piece within the die and creating depressions on either side thereof and at different positions.

The up stroke of head 38E withdraws the punch 76 and studs 39E, the latter permitting the withdrawal of the punches 80—81 from the work and die by the action of cam slots 84 and pins 85, assisted by coil springs 83. The die block 40 is now cleared and ready for advancing to the next station F.

During this next advance (station E to F), the cams 69—70 force the racks 66 inward, turning the pinions 65 and stud shafts 62 against the action of their respective springs 64, and therewith eccentrically mounted pins 61, causing the latter to withdraw the two mandrels through cooperation with slots 60. At the same time, cam 90 has guided roller 91 attached to the outer free end of arm 92 to cause the movable portion 40A of die block 40 to move outward and separate the die to release the completely formed piece. In these relative positions, the head comes to dwell at station F.

As the head 30 advances (station F to A) for the final operation, the die plungers 53, 54 and 55 are caused to move upward together, carrying therewith the finished piece until the bottom thereof is slightly above the level of the top of die block 40. In this position, the piece is carried forward until it contacts fixed wall 95, against which it is moved and cammed off the top of the die plungers by their continued advance until caught by chute 96 providing conveyance for the completed pieces. After the piece has been removed from the die plungers, the plungers are caused to descend and assume a position as illustrated in Figs. 3 and 4 so that upon their arrival at station A, they are again positioned for a charge of powder to start another cycle of operation. Coincident with the lowering of the die plungers, the cam 90 causes roller 91 and therewith arm 92 attached to die block portion 40A to move the latter back into closed position.

Throughout the present illustrations we have shown the respective punches 41, 43 and 76 operated from above to impart the compression strokes, as being single acting. In some cases, however, it may be desirable to use multiple punches to provide a means for proportioning the powder in relation to the stroke and/or in certain die formations.

Figure 20:
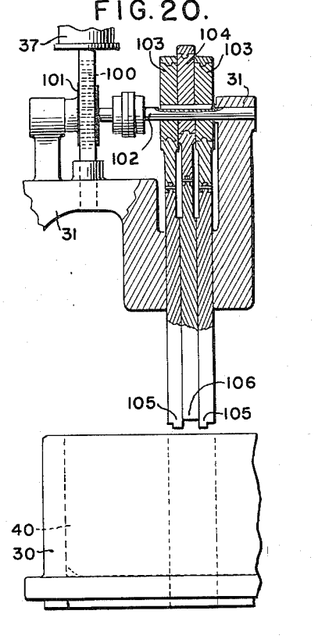
Fig. 20 is an elevation, partly in section of a modified form of multiple vertical punch, operable above the die block by an eccentric motion.

An arrangement of parts to accomplish this is illustrated in Fig. 20, wherein the reciprocating hydraulic piston 37 is provided with a rack 100 meshing with a gear 101 attached to a shaft 102 suitably supported in fixed frame 31. Eccentrics 103—104 are also carried on shaft 102 and, when rotated, impart a varied movement to die plungers 105, 106, which perform the same functions as punches 41, 43 and 76, only multiple in their action. Such mechanism, while only shown and intended to rotate shaft 102, 180 degrees and then reverse (or 360 degrees and then stop), could readily be extended to provide several revolutions of the shaft in order that a quick succession of similar blows could be delivered instead of a single compression stroke.

Figure 17:
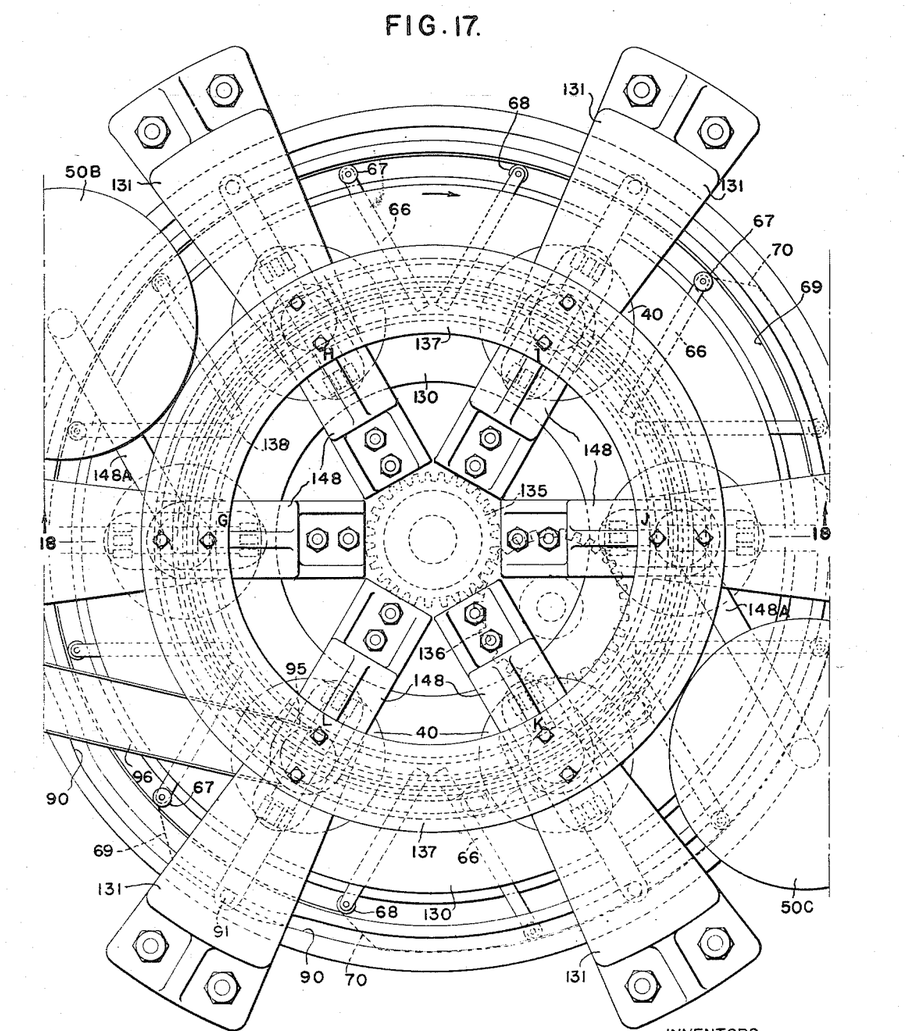
Fig. 17 is a plan view, similar to Fig. 1, showing the continuous type of machine.
Figure 18:
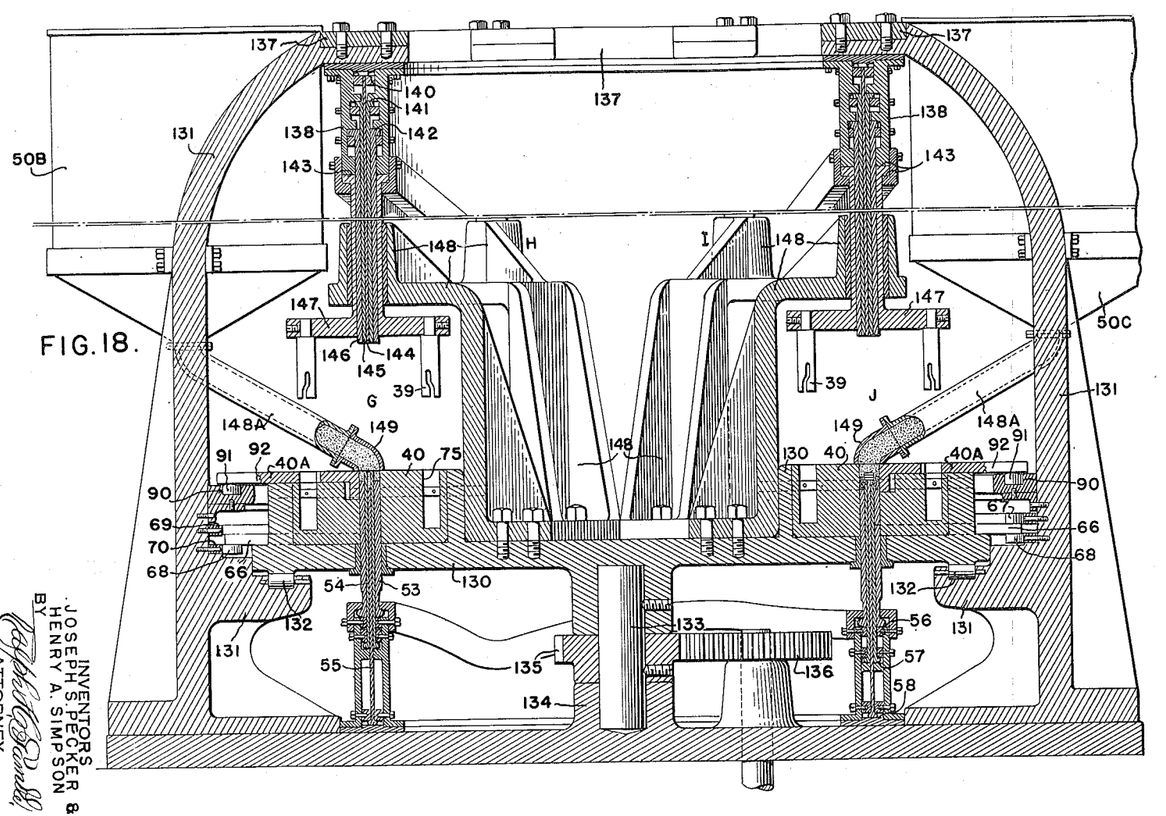
Fig. 18 is a sectional elevation, similar to Fig. 2, and taken on line 18—18 of Fig. 17.

In the second form of our invention illustrated in Figs. 17 and 18, the operation is continuous, i. e. without dwells during the cycles. In this form, we have substantially inverted a plurality of moving die plunger elements such as used below the rotating head in the first form, together with their stationary operating cams, and arranged them to travel in a circular path cooperating with similar die blocks and die plunger operating from below and travelling in circular paths as in the first form disclosed. These operating cams are supported from above by extensions of the fixed bearing members while the plungers and cross heads are supported in brackets carried by the rotating head. A continuous drive is substituted for the Geneva motion, and the powder supply hoppers are offset, so as to be out of the path of travel of the upper die plunger assemblies, and angularly arranged chutes convey the powder to the respective die cavities. Otherwise, the device is the same as in the first form.

Referring now to Figs. 17 and 18, the drawings show a rotatable head 130, supported and guided by stationary members 131 and moving over roller bearings 132. The head is secured to a vertical shaft 133 supported in a base plate 134, and a pinion 135 is likewise secured to shaft 133 and meshes with a driving gear 136, the shaft of the latter being connected with any suitable power source (not shown).

All of the stationary bearing members 131 extend upward and carry a circular supporting member 137 from which is hung a housing 138 wherein are formed cams 140, 141, 142, and 143. The first three mentioned cams respectively control the reciprocating movements of die plungers 144, 145 and 146, while cam 143 controls the reciprocations of crosshead 147. Each of these upper die plunger assemblies are carried in suitable supports 148, the supports in turn being fixed to and carried by the rotating head 130.

Two powder hoppers 50B and 50C are shown, each suitably supported in an offset position between two of the stationary supporting members 131 and angularly arranged chutes 148A are positioned to feed the powder to the cavities within the die blocks as they pass beneath them. Interchangeable ends 149 are attached to the ends of the chutes and their open ends are shaped to correspond to the shape of the die cavities, thus when the die blocks are changed to make articles of different designs, the ends 149 are changed to agree with the design of the cavities in the die blocks.

The showing of a two hopper machine indicates a two compression piece, if it is desired to build up a piece having more sections, a larger diameter is employed positioning additional sources of powder supply, one for each compression.

As before stated, the design of the rotary head 130, the split die blocks and their operating cams, the mandrels and their operating cams and the under die plungers and their operating cams are all identical with those illustrated and described in connection with our first form, and we, therefore, will not redescribe their structures, operations or functions, other than to indicate like parts with like reference characters upon the drawings, and to refer thereto where necessary in the following description of the operation.

In the enlarged details, the only differences will be in Figs. 3, 4, 5 and 6, wherein the powder supply will be introduced from angular chutes, but the chute ends will be arranged identically as the hopper ends now shown, and in Figs. 2, 7, 10 and 13, the single upper punches 41, 43 and 76 will be replaced with the multiple punches 144, 145 and 146, and all cross-heads will now be operated from cam 143 in place of pistons as in the first form.

In this second form, we have illustrated six sets of dies arranged about the circumferential path of travel, it being understood, however, that more or less can be substituted in accordance with the number of operations required to produce an individual piece. In the present showing, each die block produces a complete two pressure piece in each cycle of operation, without dwells of the head, the latter rotating continuously.

In operation, we will follow one die block in one complete cycle about its path of travel from the first powder introduction to the final ejection of the finished piece, it being understood that after the first cycle six individual pieces are in formation in the machine at the same time.

Powder is introduced to our selected die block cavity at G, Fig. 17, as the cavity moves under the chute ends 149, the separate areas 51 and 52 having been created by the positioning of the lower plungers 53, 54 and 55 during their travel over their respective cams 56, 57 and 58. As the head 130 passes position G and advances toward position H, the die plungers just mentioned are moved by their respective cams to assume positions as illustrated in Fig. 7, while the upper die plungers 144, 145 and 146 under the influence of their respective cams 140, 141, and 142 are relatively positioned so as to form a shape such as shown in punch 41 of the first form. In these positions, and guided by crosshead 147, which latter is moved in unison with the upper die plungers under the influence of its cam 143, the upper die plungers enter the die block cavity and coacting with the lower die plungers, press the powder to the shape shown in section in Fig. 7 and indicated at P, which pressing operation takes place approximately in the position indicated at H.

With the continued advance of the head 130 toward position indicated at I, both sets of die plungers move down, carrying the initial compression of the piece bodily therewith until it is positioned as shown in section at the right hand side of Fig. 2, or at station C in that particular figure.

With the continued advance of the head toward position J, the lower die plungers remain stationary supporting the initial piece formation in its lowered position, while the upper die plungers, together with crosshead 47a, are moved upward out of line of the chute of the second powder hopper 50C. Coincident with this movement, cams 69 and 70 operate rack arms 66 and through the mechanism hereinbefore described in connection with the operation of the mandrels, causes mandrels 44 and 45 to move over the piece P until they contact one another with their respective engaging faces 48 forming the overlapping joint 49 (see Fig. 14).

At position J the die block passes under the end 149 of chute 148A of the hopper 50C and receives its second charge of powder on top of the piece P and the overlapped mandrels. In this relative position, the head continues its advance toward position K, during which the upper set of die plungers are respectively arranged through the action of their cams, to assume positions to correspond with the shape of the bottom of punch 76, Fig. 13. The crosshead 147 together with the arranged plungers is then caused to descend under the influence of its cam 143, carrying therewith depending studs 39, and the respective upper die punches enter the die cavity and compress the second charge of powder to a shape such as shown in Figs. 13 and 14, to form piece P2 and pressure weld it to piece P. Coincident with this pressure from above, the slotted cams 84 in the depending studs 39, contact pins 85 and force the horizontal punches toward the piece to form the depressions on either side thereof, and as here shown in piece P.

Figure 16:
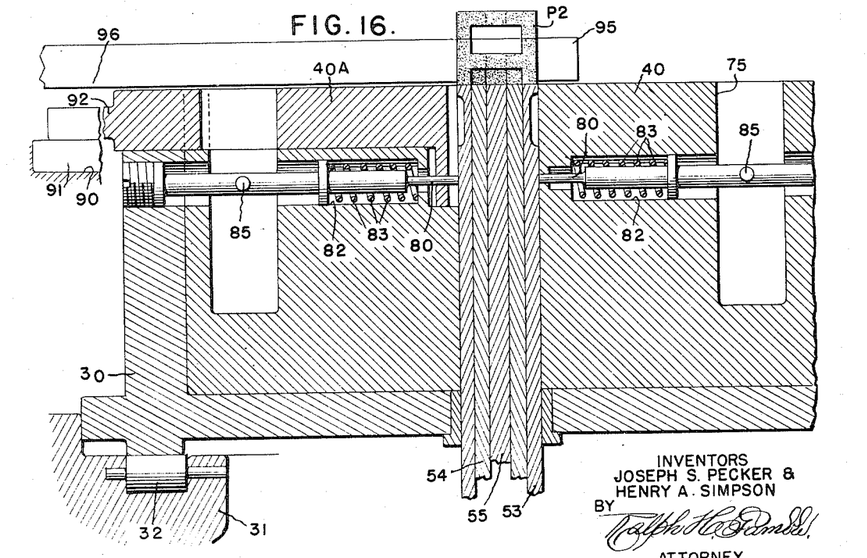
Fig. 16 is a sectional elevation taken on line 16—16 of Fig. 15.

With the continued advance of the head 130, the crosshead and the upper die plungers are withdrawn permitting the horizontal punches to withdraw from the piece and the cams 69 and 70 also influence the withdrawal of mandrels 44 and 45 from the pressed formation. As soon as the mandrels are withdrawn, the cams 56, 57 and 58 cause the respective die plungers 53, 54 and 55 to align to form a flush top as shown in Fig. 16 and, in this relative position, they move upwardly together a sufficient height to raise the completed piece slightly above the top of the cavity and die block 40. Just prior to this movement, the grooved cam 90 moves the roller 91 on arm 92 away from head 130 to cause the split portion 40A of die block 40 to open and permit the ejection of the completed piece.

The continued advance causes the piece to engage the fixed wall 95 arranged at an angle and in its path, camming it off the die plungers, and leaving the latter free for repositioning for the start of another cycle of operation, which position has been assumed by the time the die block has reached the position G, at which our cycle of operation started. Also between positions L and G, cam 90 causes the portion 40A of die block 40 to again close, so that the cavity is correctly arranged for a succeeding powder charge from hopper 50B by the time it passes thereunder.

It will thus be seen by a comparison of the two forms here disclosed that, while the continuous form is capable of greater production, its products are limited to those which can be made in a single multiple die; whereas in the intermittent type, the range of possible designs is greatly increased due to the fact that a different plunger die, or a different set of plunger dies, either operating from above or below, or both, can be present at each of the pressing stations.

While we have herein shown the horizontal punches operated from the vertical reciprocating motion of the pistons, or kindred propelling means, we could just as readily operate same from fixed cams surrounding the path of travel of the head, as disclosed for the operation of the mandrels and the die block release.

In view of our invention and disclosures, variations and modifications to meet individual whim or particular need will doubtless become evident to others skilled in this art, to obtain all or part of the benefits of our invention without copying the structure shown, and we, therefore, claim all such insofar as they fall within the reasonable spirit and scope of our invention.

Having thus described our invention, what we claim and desire to secure by Letters Patent is:

1. A method of forming articles of powder in layers which comprises successively supplying predetermined component quantities of powder to a molding space, applying forming pressure to the powder in said molding space to form a pressure weld after the introduction of the powder of each of said layers to compact and weld by a pressure operation said layers into an unitary article, and hilling up the powder and increasing the concentration of powder in areas of the mold cavity to strengthen the points of union during the pressure weld.

2. A method as defined in claim 1 wherein varying forming pressures are applied in the formation of the layers to form an integral article of varying density.

3. A method of forming articles of dry metal powder in layers which comprises successively supplying predetermined component quantities of metal powder to a molding space, applying forming pressure to the metal powder in said molding space to form a pressure weld after the introduction of the powder of each of said layers to compact and weld by a pressure operation said layers into an unitary article, and smoothing and then hilling up the powder and increasing the concentration of powder in areas of the mold cavity to strengthen the points of union during the pressure weld.

4. A method as defined in claim 3 wherein varying forming pressures are applied in the formation of the layers to form an integral article of varying density.

5. A method of forming articles of dry metal powder in layers which comprises successively supplying predetermined component quantities of metal powder to a molding space and hilling up the powder and increasing the concentration of the powder after each powder feed in those areas in which it is desired to unite the separate piece formations by pressure weld and applying forming pressure without the use of additional heat other than that inherent to the forming pressure to the metal powder in said space after introduction of the powder of each of said layers to compact and weld by a pressure operation said layers into an unitary article.

6. A method as defined in claim 3 wherein varying forming pressures are applied in the formation of certain of the layers to form an integral article of varying density.

JOSEPH S. PECKER.
HENRY A. SIMPSON.